(12) United States Patent
Lin et al.

(10) Patent No.: US 7,372,609 B2
(45) Date of Patent: May 13, 2008

(54) NANOCRYSTALLINE METAL OXIDE FILMS AND ASSOCIATED DEVICES COMPRISING THE SAME

(75) Inventors: Rongguang Lin, Holland, MI (US); Joel C. Nemes, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/081,435

(22) Filed: Mar. 16, 2005

(65) Prior Publication Data

US 2006/0209382 A1  Sep. 21, 2006

(51) Int. Cl.
*G02F 1/15* (2006.01)
*G02B 5/23* (2006.01)

(52) U.S. Cl. .................... 359/265; 252/586
(58) Field of Classification Search ........ 359/265–275; 252/586
See application file for complete search history.

(56) References Cited

U.S. PATENT DOCUMENTS

| | | | |
|---|---|---|---|
| 4,473,695 A | 9/1984 | Wrighton et al. | |
| 4,902,108 A | 2/1990 | Byker | |
| 5,282,955 A | 2/1994 | Leventis et al. | |
| 5,438,556 A | 8/1995 | Dinger et al. | |
| 5,444,330 A | 8/1995 | Leventis et al. | |
| 5,482,570 A | 1/1996 | Saurer et al. | |
| 5,668,663 A | 9/1997 | Varaprasad et al. | |
| 5,724,187 A | 3/1998 | Varaprasad et al. | |
| 5,789,592 A | 8/1998 | Gratzel et al. | |
| 5,818,636 A | 10/1998 | Leventis et al. | |
| 6,188,505 B1 | 2/2001 | Lomprey et al. | |
| 6,245,988 B1 | 6/2001 | Gratzel et al. | |
| 6,262,532 B1 | 7/2001 | Parke et al. | |
| 6,301,038 B1 | 10/2001 | Fitzmaurice et al. | |
| 6,445,486 B1 | 9/2002 | Lomprey et al. | |
| 6,605,239 B2 | 8/2003 | Fitzmaurice et al. | |
| 6,710,906 B2 | 3/2004 | Guarr et al. | |
| 6,783,099 B2 | 8/2004 | Rukavina et al. | |
| 6,842,276 B2 | 1/2005 | Poll et al. | |
| 6,870,657 B1 * | 3/2005 | Fitzmaurice et al. | 359/273 |
| 2005/0128562 A1 * | 6/2005 | Fitzmaurice et al. | 359/265 |

FOREIGN PATENT DOCUMENTS

WO  WO 98/35267  8/1998

OTHER PUBLICATIONS

Coloured electrochromic windows based on nanostructured TiO2 films modified by adsorbed redox chromophores by Rachel Cinnsealach, Gerrit Boschloo, S. Nagaraja Rao, Donald Fitzmaurice, 1999 © Elsewier Science B.V. vol. 57 pp. 107-125.

* cited by examiner

*Primary Examiner*—Evelyn A. Lester
(74) *Attorney, Agent, or Firm*—King & Partners, PLC

(57) ABSTRACT

A nanoporous-nanocrystalline film, comprising a nanoporous-nanocrystalline, semi-conducting metal oxide having a redox active material or redox chromophore attached thereto, wherein the redox active material or redox chromophore comprises at least one of an isocyanate, a silane, and a siloxane attachment promoting moiety.

29 Claims, 2 Drawing Sheets

NANOCRYSTALLINE METAL OXIDE FILMS AND ASSOCIATED DEVICES COMPRISING THE SAME

CROSS-REFERENCE TO RELATED APPLICATION(S)

Not Applicable

BACKGROUND OF THE INVENTION

1. Field of the Invention

The present invention relates in general to nanocrystalline metal oxide films and, more particularly, to nanocrystalline metal oxide films having a redox active material or redox chromophore attached thereto, wherein the redox active material or redox chromophore includes an attachment promoting moiety to, in turn, enhance durability of associated devices using the same.

2. Background Art

Nanocrystalline metal oxide films have been known in the art for several years and are the subject of a plurality of United States Patents, including, for example, U.S. Pat. No. 6,605,239 B2 entitled "Electrochromic System," and U.S. Pat. No. 6,301,038 B1 entitled "Electrochromic System," both of which are issued to Fitzmaurice et al., and both of which are hereby incorporated herein by reference in their entirety, including the references cited therein.

As is disclosed in the above-referenced patents, attachment of a redox chromophore (which in many cases comprises an organic dye, such as a viologen) to a nanocrystalline metal oxide conventionally occurs utilizing a phosphate or carboxylate moiety.

While attachment of a redox chromophore to a nanocrystalline metal oxide using a phosphate or carboxylate moiety has been disclosed, durability of the same in devices, such as electrochromic devices, solar cells, etcetera, remains largely problematic, or at least, less than desirable for commercial applications.

It has now been surprisingly discovered that nanocrystalline metal oxide films for use in associated electrochromic devices, solar cells, etcetera, can be fabricated which exhibit increased durability by utilizing a redox active material or redox chromophore which comprises an enhanced attachment promoting moiety.

It is therefore an object of the present invention to provide nanocrystalline metal oxide films having a redox active material or redox chromophore attached thereto, which remedies the aforementioned detriments and/or complications associated with the durability of conventional nanocrystalline metal oxide films and associated devices.

These and other objects of the present invention will become apparent in light of the present specification, claims, and drawings.

SUMMARY OF THE INVENTION

The present invention is directed to a nanoporous-nanocrystalline film, comprising a semi-conducting metal oxide having a redox active material or redox chromophore attached thereto, wherein the redox active material or redox chromophore comprises an isocyanate, a silane, and/or a siloxane attachment promoting moiety.

In a preferred embodiment of the present invention, a redox chromophore comprises an anodic and/or cathodic material.

In another preferred embodiment of the present invention, a redox chromophore comprises a compound represented by the following formula:

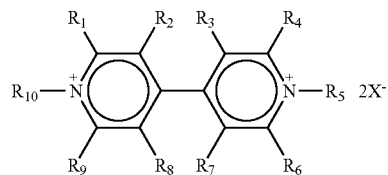

wherein X comprises a charge balancing ion; and wherein $R_1$-$R_{10}$ are the same or different and comprise H, a hydroxy group, an isocyanate, a straight or branched alkyl, cycloalkyl, polycycloalkyl, heterocycloalkyl, aryl, alkaryl, aralkyl, alkoxy, alkenyl, alkynyl group containing approximately 1 to approximately 50 carbon atom(s), a silyl or siloxyl group containing approximately 1 to approximately 50 silicon atom(s), with the provisio that at least one of $R_1$-$R_{10}$ comprises at least one of an isocyanate, a silane, and a siloxane attachment promoting moiety.

In this embodiment, the redox chromophore may comprise compounds represented by the following formulae:

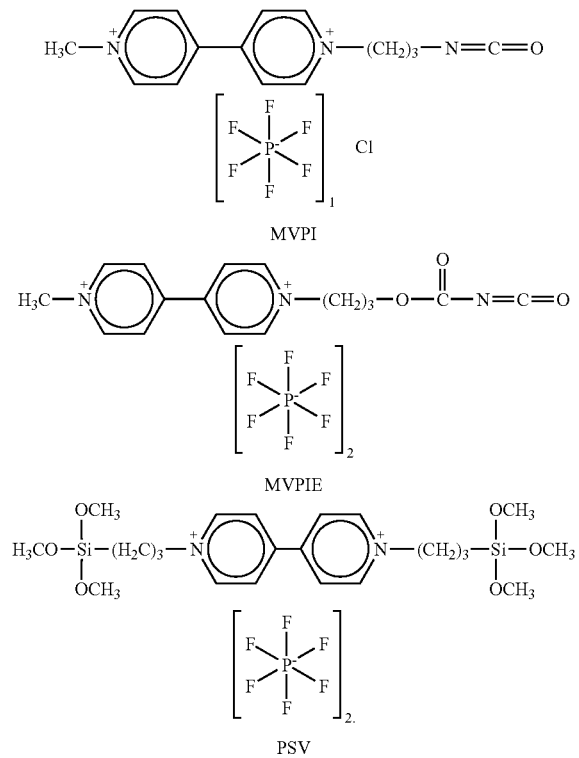

The present invention is also directed to an electrochromic device or solar cell, comprising: (a) a first electrode comprising a first substrate having an electrically conductive material associated therewith and a nanoporous-nanocrystalline film as disclosed herein above; (b) a second electrode comprising a second substrate having an electrically conductive material associated therewith; and (c) an electrochemical medium contained within a chamber positioned between the first and second substrates.

BRIEF DESCRIPTION OF THE DRAWINGS

The invention will now be described with reference to the drawings wherein.

DETAILED DESCRIPTION OF THE INVENTION

Figure 1:
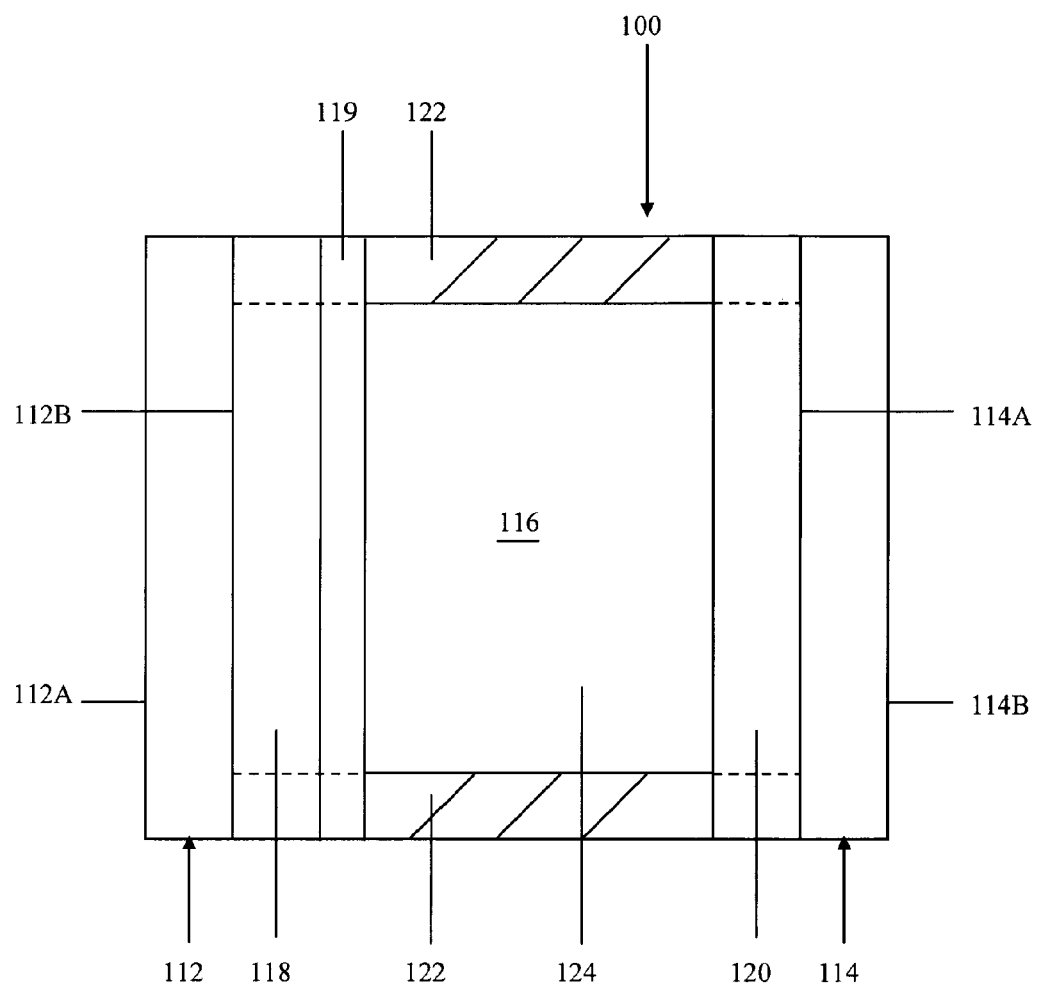
FIG. 1 of the drawings is a cross-sectional schematic representation of an electrochromic device fabricated in accordance with the present invention.

It will be understood that like or analogous elements and/or components, referred to herein, may be identified throughout the drawings with like reference characters.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochemical medium 124. It will be understood that electrochromic device 100 may comprise, for illustrative purposes only, a mirror, a window, a display device, a variable reflector, and the like. It will be further understood that FIG. 1 is merely a schematic representation of electrochromic device 100. As such, some of the components have been distorted from their actual scale for pictorial clarity.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas,® which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that substrate 112 may be modified by texturing either one of surfaces 112A or 112B, for example, by acid etching to form a diffusely reflecting device as is taught in U.S. Pat. No. 6,256,135 entitled "Diffusely-reflecting Reversible Electrochemical Mirror," which is hereby incorporated herein by reference in its entirety.

Second substrate 114 may be fabricated from similar materials as that of first substrate 112. However, it will be understood that second substrate 114 does not need to be transparent for a plurality of applications. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium tin oxide (ITO), doped zinc oxide or any one of a number of other materials known to those having ordinary skill in the art.

Nanoporous-nanocrystalline layer/film 119 at least partially covers the inner surface, proximate chamber 116, of electrically conductive material 118. While nanoporous-nanocrystalline layer/film 119 has been disclosed as being associated with electrically conductive material 118, it is likewise contemplated that nanoporous-nanocrystalline layer/film 119 can, alternatively or additionally, be associated with electrically conductive material 120—depending upon the device configuration. It will be understood that nanoporous-nanocrystalline layer/film 119 comprises a nanoporous-nanocrystalline film having a semi-conducting metallic oxide with a redox active material or redox chromophore attached thereto. Regardless of their ordinary meanings, the terms "redox active material" will be defined herein as a material that undergoes a modification in its oxidation state when a potential in the normal operating range of an associated device is applied, and "redox chromophore" will be defined herein as a material that has a change in its extinction coefficient at one or more wavelengths upon said change in oxidation. It will be further understood that regardless of its ordinary meaning, the term "nanoporous-nanocrystalline layer/film" will be defined herein as being constituted from fused nanometer-scale crystallites. In a "nanoporous-nanocrystalline film" the morphology of the fused nanocrystallites is such that it is porous on the nanometer-scale. Such films, which may hereinafter be referred to as nanostructured films, typically possess a surface roughness of about 1000 assuming a thickness of about 10 microns. For purposes of the present disclosure, nanoporous-nanocrystalline layer/film 119 can be fabricated using conventional techniques including, but not limited to, those identified in U.S. Pat. No. 6,605,239. Preferably, nanoporous-nanocrystalline layer/film 119 ranges in thickness from approximately 0.5 microns to approximately 100 microns, and more preferably between approximately 1 micron and approximately 20 microns.

The semi-conducting metallic oxide of nanoporous-nanocrystalline layer/film 119 may be fabricated from any one of a number of materials, including, but not limited to, an oxide of any suitable metal, such as, for example, chromium, hafnium, indium, iron ($Fe^{2+}$ or $Fe^{3+}$), molybdenum, nickel, niobium, silver, strontium, tantalum, tin, titanium, tungsten, vanadium, zinc, zirconium, perovskites, and un-doped and/or doped combinations thereof. For a plurality of reasons un-doped and/or doped $TiO_2$, $WO_3$, $MoO_3$, $ZnO$, and $SnO_2$ have been found to be particularly preferred.

Electrically conductive material 120 is preferably associated with front surface 114A of second substrate 114, and is operatively bonded to either electrically conductive material 118 or nanostructured film 119 by sealing member 122. As can be seen in FIG. 1, once bonded, sealing member 122 and the juxtaposed portions of electrically conductive material 118 or nanostructured film 119 and electrically conductive material 120 serve to define an inner peripheral geometry of chamber 116. Electrically conductive material 120 may be fabricated from similar materials as that of electrically conductive material 118.

Electrically conductive material 120 may vary depending upon the intended use of the device. For example, if the device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of U.S. Pat. No. 5,818,625, which is hereby incorporated herein by reference in its entirety. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive material 118 and/or nanostructured film 119 and electrically conductive material 120 to, in turn, seal chamber 116 so that electrochemical medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 and nanostructured film 119 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," and U.S. Pat. No. 6,157,480 entitled "Seal For Electrochromic Devices," all of which are hereby incorporated herein by reference in their entirety.

For purposes of the present disclosure, electrochemical medium 124 preferably comprises an anodic material (which may optionally be a redox chromophore), and a cathodic material (which may optionally be a redox chromophore), wherein either one or both of the anodic and cathodic materials comprises an isocyanate, a silane, and/or a siloxane attachment promoting moiety, which, as will be shown experimentally below, serves to enhance durability of an associated device. It will be understood that either one or both of the anodic and cathodic materials can be attached to a nanocrystalline film—depending upon the device configuration (i.e. a single or dual surface attached system).

Cathodic materials may include, for example, viologens, such as methyl viologen tetrafluoroborate, octylviologen tetrafluoroborate, or benzyl viologen tetrafluoroborate. It will be understood that the preparation and/or commercial availability for each of the above-identified cathodic materials is well known in the art. While specific cathodic materials have been provided, for illustrative purposes only, numerous other conventional cathodic materials are likewise contemplated for use including, but by no means limited to, those disclosed in U.S. Pat. No. 4,902,108 and U.S. Pat. No. 6,710,906 entitled "Controlled Diffusion Coefficient Electrochromic Materials For Use In Electrochromic Mediums And Associated Electrochromic Devices," as well as U.S. Pat. No. 4,473,695 entitled "Synthesis of N,N'-Dialkyl-4' Bipyridinium Reagents," U.S. Pat. No. 6,605,239 entitled "Electrochromic System," and U.S. Pat. No. 5,818,636 entitled "Complementary Surface Confined Polymer Electrochromic Materials, Systems, and Methods of Fabrication Therefor," of which are hereby incorporated herein by reference in their entirety. Moreover, it is contemplated that the cathodic material may comprise a polymer film, such as various substituted polythiophenes, polymeric viologens, an inorganic film, or a solid transition metal oxide, including, but not limited to, tungsten oxide. As will be shown below, cathodic materials may include at least one of an isocyanate, a silane, and a siloxane attachment promoting moiety.

In one embodiment of the present invention, a cathodic redox chromophore is provided which comprises a compound represented by the following formula:

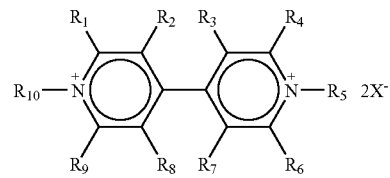

wherein X comprises a charge balancing ion; and wherein $R_1$-$R_{10}$ are the same or different and comprise H, a hydroxy group, an isocyanate, a straight or branched alkyl, cycloalkyl, polycycloalkyl, heterocycloalkyl, aryl, alkaryl, aralkyl, alkoxy, alkenyl, alkynyl group containing approximately 1 to approximately 50 carbon atom(s), a silyl or siloxyl group containing approximately 1 to approximately 50 silicon atom(s), with the provisio that at least one of $R_1$-$R_{10}$ comprises at least one of an isocyanate, a silane, and a siloxane attachment promoting moiety.

Specific examples of cathodic redox chromophores include, for example:

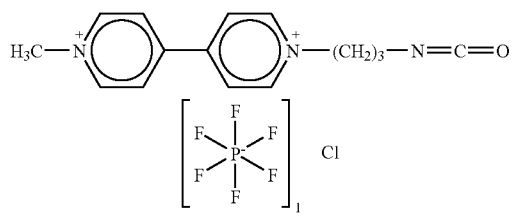

MVPI

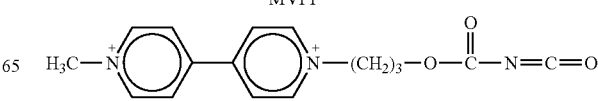

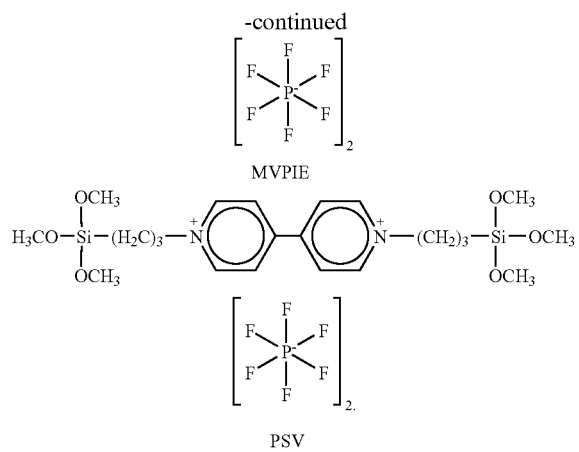

MVPIE

PSV

For purposes of the present invention, anodic materials may include any one of a number of materials including ferrocene, substituted ferrocenes, substituted ferrocenyl salts, substituted phenazines, phenothiazine, substituted phenothiazines, triphenodithiazines, especially 3,10-dimethoxy-7,14,-(triethylammoniumbutyl) triphenodithiazine as is disclosed in U.S. Pat. No. 6,710,906, which is hereby incorporated herein by reference in its entirety, thianthrene, substituted thianthrenes, hydroquinones, and substituted hydroquinones such as trimethylhydroquinone. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine, as well as those provided in experiments infra. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," U.S. Pat. No. 5,998,617 entitled "Electrochromic Compounds," U.S. Pat. No. 6,188,505 B1 entitled "Color-Stabilized Electrochromic Devices," and U.S. Pat. No. 6,710,906 entitled "Controlled Diffusion Coefficient Electrochromic Materials For Use In Electrochromic Mediums And Associated Electrochromic Devices," all of which are hereby incorporated herein by reference in their entirety. Anodic materials disclosed in U.S. Pat. No. 5,818,636 are likewise contemplated for use in accordance with the present invention. These materials may or may not persist in solution upon electrochemical oxidation. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. In accordance with the present invention, the anodic materials may include at least one of an isocyanate, a silane, and a siloxane attachment promoting moiety.

In accordance with the present invention, the anodic material may be replaced by a counter electrode that exhibits a large capacitance. For example, activated carbon powders having a large specific surface area such as those disclosed by Nishikitani et al., (Electrochimica Acta 44, 18 p3211 (1999)), which is hereby incorporated herein by reference in its entirety.

Electrochemical medium 124 may also comprise one or more redox buffers, color-stabilizers, and/or additives consistent with those disclosed in U.S. Pat. No. 6,188,505, U.S. Pat. No. 6,310,714, U.S. Pat. No. 6,433,914, and/or U.S. Pat. No. 6,697,185, all of which are entitled "Color-Stabilized Electrochromic Devices," and all of which are hereby incorporated herein by reference in their entirety.

In addition, electrochemical medium 124 may comprise other materials, such as light absorbers, light stabilizers, thermal stabilizers, antioxidants, thickeners, viscosity modifiers, tint providing agents, and mixtures thereof. Suitable UV-stabilizers may include: the material ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl] propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

Electrochemical medium 124 may comprise any one of a number of common, commercially available solvents, including 3-methylsulfolane; dimethyl sulfoxide; N,N-dimethyl formamide (DMF); glymes, such as di(ethyleneglycol) methylether, tetraglyme, and other polyethers; alcohols, such as ethoxyethanol, glycols, etcetera; nitrites, such as acetonitrile, glutaronitrile, 3-hydroxypropionitrile, and 2-methylglutaronitrile; ketones, including 2-acetylbutyrolactone, and cyclopentanone; cyclic esters including beta-propiolactone, gamma-butyrolactone (GBL), and gamma-valerolactone; propylene carbonate (PC); ethylene carbonate; ionic liquids (See U.S. Pat. No. 6,552,843—which is hereby incorporated herein by reference in its entirety) and homogenous mixtures of the same. While specific solvents have been disclosed as being associated with the electrochemical medium, numerous other solvents that would be known to those having ordinary skill in the art having the present disclosure before them are likewise contemplated for use.

The electrochemical medium can also be gelled or comprise a crosslinked polymer matrix as is described in U.S. Pat. No. 5,679,283 entitled "Electrochromic Layer and Devices Comprising Same," which is hereby incorporated herein by reference in its entirety.

The electrochemical medium may also comprise a polymer that may further include a plasticizer and may also include an inert salt. The polymer may be a commercially available polymer such as PEO, PVF, PVB, PMMA, etcetera. One example of a polymeric solid electrolyte medium is disclosed in U.S. Pat. No. 6,361,709 B1 entitled "Optically Transparent Polymeric Solid Electrolyte," which is hereby incorporated herein by reference in its entirety.

Figure 2:
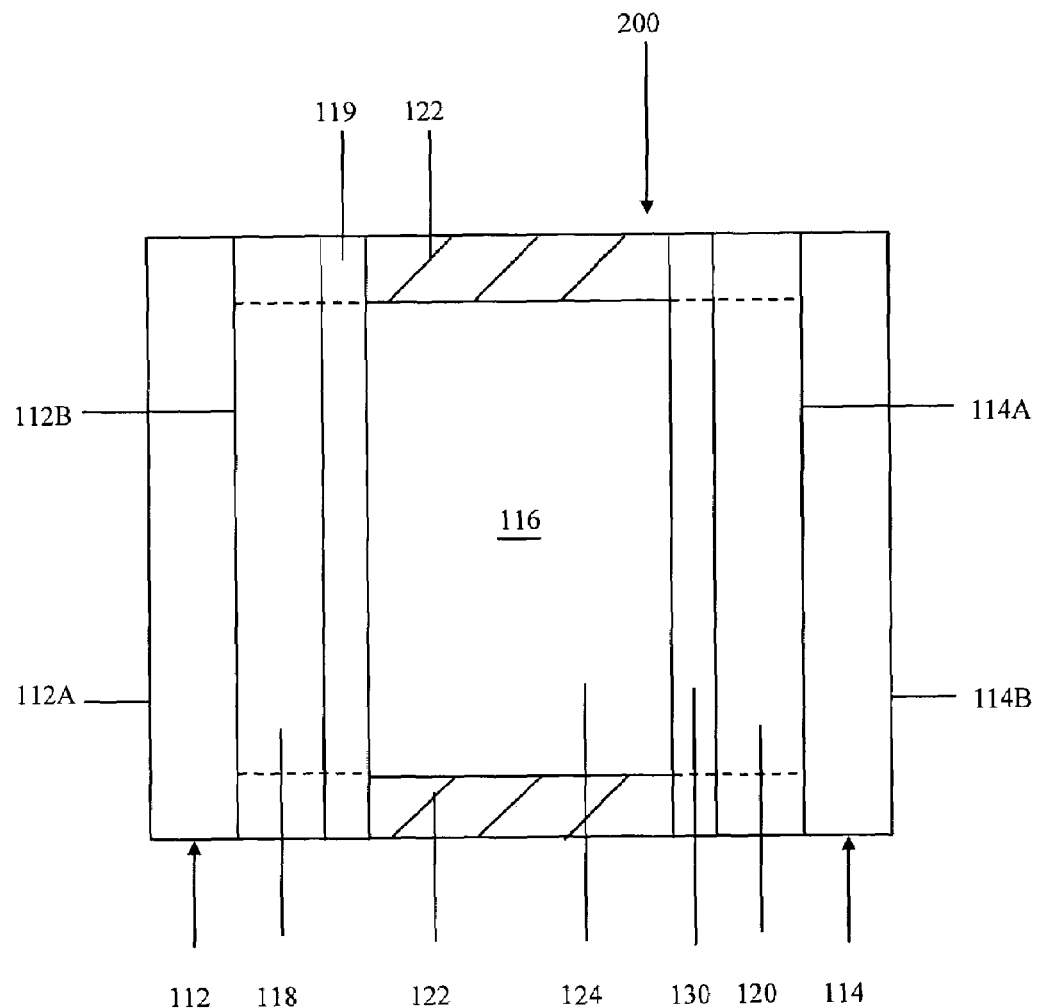
FIG. 2 of the drawings is a cross-sectional schematic representation of a solar cell fabricated in accordance with the present invention.

Referring now to the drawings and to FIG. 2 in particular, a cross-sectional schematic representation of solar cell 200 is shown, which is structurally similar in many ways to electrochromic device 100, and which generally comprises first substrate 112, second substrate 114, chamber 116, electrically conductive material 118, nanoporous-nanocrystalline layer/film 119, electrically conductive material 120

(which may comprise a reflective metal layer and/or a transparent conductive metal oxide), sealing member 122, electrochemical medium 124, and optional catalytic metal layer 130 (e.g. platinum deposited via thermal evaporation, sputtering, and/or galvanic deposition). It will be understood that FIG. 2 is merely a schematic representation of solar cell 200. As such, some of the components have been distorted from their actual scale for pictorial clarity.

Electrochromic devices as disclosed herein can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; variable reflectors—just to name a few. In addition, the nanostructured films, disclosed in the present invention may also be used in photovoltaic and/or solar cells, the structure of which are well disclosed in U.S. Pat. Nos. 6,245,988, 5,789,592 and 5,482,570 issued to Gratzel et al. and U.S. Pat. No. 5,438,556 issued to Dinger et al., all of which are hereby incorporated herein by reference in their entirety including all references cited therein.

One specific electrode material suitable for use in solar cells, in accordance with the present invention, is provided below:

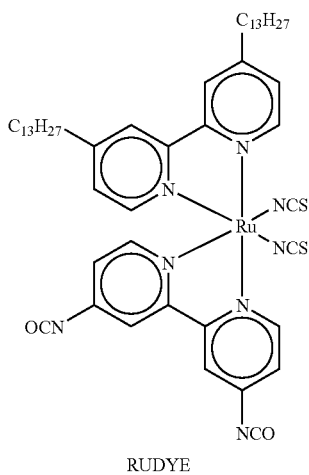

RUDYE

The redox active materials, redox chromophores, electrode materials, and electrochemical media of the present invention utilize many different materials, the preparation and/or commercially available sources are provided herein, unless the material is well known in the art. It will be understood that, unless specified otherwise, the starting reagents are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (mL); moles (mol); millimoles (mmol); molar (M); millimolar (mM); pounds per square inch (psi); hours (h); and degrees Centigrade (° C.).

Synthesis of RUDYE $Ru(DMSO)_4Cl_2$ was prepared from ruthenium trichloride trihydrate and dimethylsulfoxide (DMSO) according to Evans et al., J. Chem. Soc. Dalton Trans. (1973) pg. 204-209.

4,4'-dinitro-2,2'-bipyridine-1,1'-dioxide was prepared according to Donnici et al., J. Braz. Chem. Soc. 9 (1998) pp. 455-460.

4,4'-diamino-2,2'-bipyridine. 1.34 g of 4,4'-dinitro-2,2'-bipyridine-1,1'-dioxide was suspended in 75 mL of methanol under argon. The mixture was cooled to 0° C. then 0.5 g of 5% Pd/C was added followed by portion wise addition of 1.82 g of sodium borohydride over 10 minutes. The mixture was allowed to warm to room temperature then stirred for 48 hours. The mixture was filtered through a two inch plug of Celite.® Rotary evaporation of the filtrate yielded an off-white solid that was dissolved in 100 mL of 20% HCl. Insoluble residue was removed by filtration then the solution was washed with 100 mL of ether followed by neutralization to pH=8 using 50% NaOH. Cooling to 4° C. yielded a white precipitate which was collected by filtration. The solid was dried under vacuum overnight to yield the desired product as a white powder.

4,4'-bis(tridecyl)-2,2'-bipyridine. 57 mmol of fresh lithium diisopropylamine (LDA) was prepared from 22.8 mL of n-butyllithium (2.5M in hexanes) and 8.4 mL of diisopropylamine in 15 mL anhydrous tetrahydrofuran (THF). A 500 mL flask was charged with 5.0 g of 4,4'-dimethyl-2,2'-bipyridine in 125 mL anhydrous THF under a blanket of nitrogen. The LDA was added over one hour via pressure equalizing addition funnel. The dark solution was cooled to 0° C. after two hours then 16.3 mL 1-dodecylbromide in 90 mL anhydrous THF was added slowly via pressure equalizing addition funnel. The solution was stirred at room temperature for 16 hours after which it was poured into 200 mL of cold water. The product was extracted into ether (2×150 mL), washed with water, and then dried over $MgSO_4$. The solvent was removed by rotary evaporation to yield a gummy, white solid. The pure product was obtained by recrystallization from ethanol.

200 mg of $Ru(DMSO)_4Cl_2$ was combined with 77 mg 4,4'-diamino-2,2'-bipyridine in 50 mL anhydrous 2-methoxyethanol under nitrogen. The solution was refluxed for 4 hours followed by addition of 215 mg 4,4'-bis(tridecyl)-2,2'-bipyridine. After another 15 hours of reflux, 2.0 g $NH_4NCS$ was added. The dark red solution was refluxed for an additional 5 hours. It was cooled then slowly poured into 200 mL of $H_2O$ to yield a dark red precipitate. The solid was collected by filtration then was purified on a Sephadex LH-20 column (Amersham Biosciences) using 1:1 methanol/dichloromethane as the mobile phase. 48 mg of the pure precursor, diamino dye, 150 mg of triphosgene, and 1.6 g of 2,6-lutidine were combined in 70 mL of anhydrous toluene under nitrogen. The mixture was refluxed for 1.5 hours. The solvent, lutidine, and residual byproducts were then removed by vacuum to yield the desired diisocyanate ruthenium dye as a dark red powder.

Synthesis of PSV 50 g of 3-iodopropyltrimethoxylsilane was added to 160 ml of anhydrous acetonitrile and the mixture was heated to reflux under a nitrogen atmosphere. 5 g of 4,4-dipyridyl in 30 ml of anhydrous acetonitrile solution was slowly added via a pressure-equalizing addition funnel. The mixture was refluxed for an additional 8 hours and red solid was precipitated from the solution. The red solid was isolated by filtration and rinsed with anhydrous acetonitrile and anhydrous ether. The crude product (as an iodide salt) was redissolved in hot anhydrous methanol. 11 g of ammonium hexafluorophosphate in anhydrous methanol was added and the solution was refrigerated overnight. The pure product was isolated as transparent needle crystals.

Synthesis of MVPEI 2.5 g of 1-methyl-4,4'-bipyridinium iodide was added to 20 ml of anhydrous acetonitrile and the mixture was heated to reflux. 1.2 g of 3-bromo-1-propanol in 10 ml of anhydrous acetonitrile was added via additional funnel. The mixture was refluxed for an additional 4 hours and on cooling red solid was precipitated out from the solution. The red solid was isolated by filtration, rinsed with anhydrous acetonitrile and anhydrous ether. The red solid (as a bromide and iodide salt) was redissolved in hot 1:1 water/ethanol. 5 g of ammonium hexafluorophosphate in water was added and the solution was refrigerated overnight. The white solid was isolated, rinsed with water and ethanol, and dried in a vacuum. 1 g of the white solid was dissolved in 10 ml of dry acetonitrile and the mixture was cooled in an ice-bath at 4-5° C. 3 ml of chlorocarbonyl isocyanate in 10 ml of anhydrous acetonitrile was slowly added via a pressure-equalizing additional funnel. The temperature of the reaction mixture was allowed to slowly rise to room temperature. The mixture was heated to reflux for an additional 30 minutes. The crude product was isolated by precipitation with anhydrous ether. The pure product was obtained by recrystallization from acetonitrile/ether.

Synthesis of MVPI 2.5 g of 1-methyl-4,4'-bipyridinium hexafluorophosphate was added to 20 ml of anhydrous acetonitrile and the mixture was heated to reflux. 3-chloropropylisocyanate (5.0 g) in 10 ml of anhydrous acetonitrile was added via an additional funnel. The mixture was refluxed for additional 4 hrs and on cooling pale yellow solid was precipitated out from the solution. The solid was isolated by filtration, rinsed with anhydrous acetonitrile and ether.

Attachment of the viologen to $TiO_2$ can be accomplished via two methods. The first method is to prepare isocyanate-containing viologen, such as MVPI, and then attach the viologen to $TiO_2$ surface by adsorption. The second method is through surface reaction. The procedure is accomplished as follows: Freshly prepared $TiO_2$ film on ITO surface is immersed in 10 mM 3-chloropropyl isocyanate in acetonitrile at room temperature overnight. The film is washed with acetonitrile and then dipped into 10 mM 1-methyl-4,4'-bipyridinium hexafluorophosphate in acetonitrile at 70° C. for 3 days.

In support of the present invention, two experiments were conducted wherein the nanocrystalline film attachment performance of a viologen having a conventional, terminal carboxylate moiety was compared to: (1) viologens having an isocyanate attachment promoting moiety; and (2) a viologen having a siloxane attachment promoting moiety.

Experiment No. 1

In this experiment 1,1'-(bis-2-carboxyethyl)-4,4'-bipyridyl dichloride (See Nanostructured $TiO_2$ Semiconductor Electrodes Modified with Surface Attached Viologens: Applications for Displays and Smart Windows, Hagfeldt et al., SPIE, 2531, pp 60-69, (1995)) MVPI, and MVPIE were attached to similarly prepared nanocrystalline films (i.e. nanocrystalline $TiO_2$ on fluorine-doped tin oxide as provided in U.S. Pat. No. 6,605,239), as follows:

With regard to 1,1'-(bis-2-carboxyethyl)-4,4'-bipyridyl dichloride, the electrode was dipped into a 1 mM solution of the carboxylate viologen in ethanol containing 10% water for four days.

With regard to MVPI and MVPIE, the electrodes were dipped into a 5 mM solution of the isocyanate viologen in a 9/1 (by volume) acetonitrile and water for two days.

Electrochemical cycling of the three films in a 1M $LiClO_4$ in PC solution clearly showed that after only 25 reduction cycles the current for the carboxylate attached films had been materially reduced. However, the isocyanate attached films (MVPI and MVPIE) exhibited substantially the same current even after 100 reduction cycles. As such, Experiment No. 1 verifies that utilization of an isocyanate attachment promoting moiety in association with a redox chromophore (i.e. viologen) enhances the electrochemical performance of an associated device, relative to utilization of an carboxylate moiety in association with a redox chromophore (i.e. viologen).

Experiment No. 2

In this experiment 1,1'-(bis-2-carboxyethyl)-4,4'-bipyridyl dichloride and PSV were attached to similarly prepared nanocrystalline films (i.e. nanocrystalline $TiO_2$ on fluorine-doped tin oxide as provided in the U.S. Pat. No. 6,605,239), as follows:

With regard to 1,1'-(bis-2-carboxyethyl)-4,4'-bipyridyl dichloride, the electrode was dipped into a 1 mM solution of the carboxylate viologen in ethanol containing 10% water for four days.

With regard to PSV, the electrode was dipped into a 5 mM solution of the isocyanate viologen in a 9/1 (by volume) acetonitrile and water for two days.

Electrochemical cycling of the two films in a 1M $LiClO_4$ in PC solution clearly showed that after only 25 reduction cycles the current for the carboxylate attached films had been materially reduced. However, the siloxane attached films exhibit substantially the same current even after 100 reduction cycles. As such, Experiment No. 2 verifies that utilization of a siloxane attachment promoting moiety in association with a redox chromophore (i.e. viologen) enhances the electrochemical performance of an associated device, relative to utilization of a carboxylate moiety in association with a redox chromophore (i.e. viologen).

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. A nanoporous-nanocrystalline film, comprising: a nanoporous-nanocrystalline, semi-conducting metal oxide having a redox active material or redox chromophore attached thereto, wherein the redox active material or redox chromophore comprises at least one of an isocyanate, a silane, and a siloxane attachment promoting moiety.

2. The nanoporous-nanocrystalline film according to claim 1, wherein the redox chromophore comprises a cathodic material.

3. The nanoporous-nanocrystalline film according to claim 2, wherein the redox chromophore comprises an isocyanate attachment promoting moiety.

4. The nanoporous-nanocrystalline film according to claim 2, wherein the redox chromophore comprises a silane attachment promoting moiety.

5. The nanoporous-nanocrystalline film according to claim 2, wherein the redox chromophore comprises a siloxane attachment promoting moiety.

6. The nanoporous-nanocrystalline film according to claim 2, wherein the redox chromophore comprises a viologen.

7. The nanoporous-nanocrystalline film according to claim 6, wherein the redox chromophore comprises a viologen having an isocyanate attachment promoting moiety.

8. The nanoporous-nanocrystalline film according to claim 6, wherein the redox chromophore comprises a viologen having a silane attachment promoting moiety.

9. The nanoporous-nanocrystalline film according to claim 6, wherein the redox chromophore comprises a viologen having a siloxane attachment promoting moiety.

10. The nanoporous-nanocrystalline film according to claim 1, wherein the redox chromophore comprises an anodic material.

11. The nanoporous-nanocrystalline film according to claim 10, wherein the redox chromophore comprises an isocyanate attachment promoting moiety.

12. The nanoporous-nanocrystalline film according to claim 10, wherein the redox chromophore comprises a silane attachment promoting moiety.

13. The nanoporous-nanocrystalline film according to claim 10, wherein the redox chromophore comprises a siloxane attachment promoting moiety.

14. The nanoporous-nanocrystalline film according to claim 1, wherein the redox chromophore comprises a compound represented by the following formula:

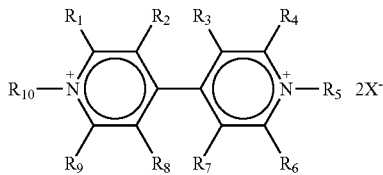

wherein X comprises a charge balancing ion; and
wherein $R_1$-$R_{10}$ are the same or different and comprise H, a hydroxy-group, an isocyanate, a straight or branched alkyl, cycloalkyl, polycycloalkyl, heterocycloalkyl, aryl, alkaryl, aralkyl, alkoxy, alkenyl, alkynyl group containing approximately 1 to approximately 50 carbon atom(s), a silyl or siloxyl group containing approximately 1 to approximately 50 silicon atom(s), with the provisio that at least one of $R_1$-$R_{10}$ comprises at least one of an isocyanate, a silane, and a siloxane attachment promoting moiety.

15. The nanoporous-nanocrystalline film according to claim 1, wherein the redox chromophore comprises a compound represented by the following formula:

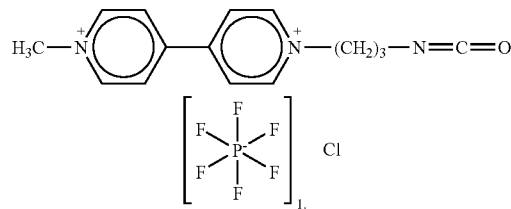

16. The nanoporous-nanocrystalline film according to claim 1, wherein the redox chromophore comprises a compound represented by the following formula:

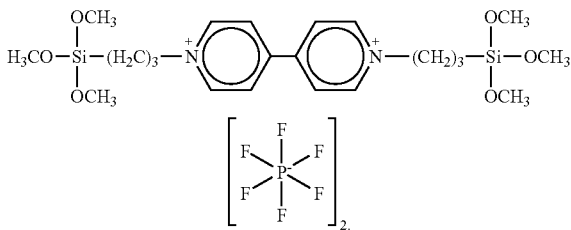

17. The nanoporous-nanocrystalline film according to claim 1, wherein the metal oxide comprises an oxide of a metal selected from at least one of chromium, hafnium, indium, iron ($Fe^{2+}$ or $Fe^{3+}$), molybdenum, nickel, niobium, silver, strontium, tantalum, tin, titanium, tungsten, vanadium, zinc, zirconium, perovskites, and un-doped or doped combinations thereof.

18. An electrochromic device, comprising:
a first electrode comprising a first substrate having an electrically conductive material associated therewith and a nanoporous-nanocrystalline film according to claim 1;
a second electrode comprising a second substrate having an electrically conductive material associated therewith; and
an electrochemical medium contained within a chamber positioned between the first and second substrates.

19. The electrochromic device according to claim 18, further comprising a redox buffer.

20. The electrochromic device according to claim 18, wherein the device comprises an electrochromic window.

21. The electrochromic device according to claim 18, wherein the second substrate is plated with a reflective material.

22. The electrochromic device according to claim 21, wherein the device comprises an electrochromic mirror.

23. A solar cell, comprising:
a first electrode comprising a first substrate having an electrically conductive material associated therewith and a nanoporous-nanocrystalline film according to claim 1;
a second electrode comprising a second substrate having an electrically conductive material associated therewith; and
an electrochemical medium contained within a chamber positioned between the first and second substrates.

24. A nanoporous-nanocrystalline film, comprising: a nanoporous-nanocrystalline, semi-conducting metal oxide having a redox chromophore attached thereto, wherein the redox chromophore comprises a compound represented by the following formula:

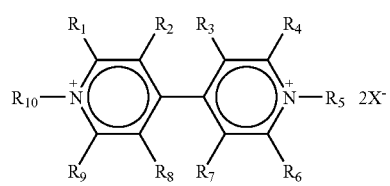

wherein X comprises a charge balancing ion; and
wherein $R_1$-$R_{10}$ are the same or different and comprise H, a hydroxy group, an isocyanate, a straight or branched alkyl, cycloalkyl, polycycloalkyl, heterocycloalkyl, aryl, alkaryl, aralkyl, alkoxy, alkenyl, alkynyl group containing approximately 1 to approximately 50 carbon atom(s), a silyl or siloxyl group containing approximately 1 to approximately 50 silicon atom(s), with the provisio that at least one of $R_1$-$R_{10}$ comprises at least one of an isocyanate, a silane, and a siloxane attachment promoting moiety.

25. The nanoporous-nanocrystalline film according to claim 24, wherein the metal oxide comprises an oxide of a metal selected from at least one of chromium, hafnium, indium, iron ($Fe^{2+}$ or $Fe^{3+}$), molybdenum, nickel, niobium, silver, strontium, tantalum, tin, titanium, tungsten, vanadium, zinc, zirconium, perovskites, and un-doped or doped combinations thereof.

26. A nanoporous-nanocrystalline film, comprising: a nanoporous-nanocrystalline, semi-conducting metal oxide having a redox chromophore attached thereto, wherein the redox chromophore comprises a compound represented by the following formula:

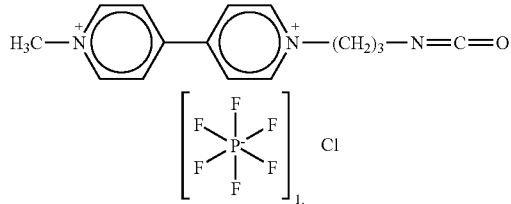

27. The nanoporous-nanocrystalline film according to claim 26, wherein the metal oxide comprises an oxide of a metal selected from at least one of chromium, hafnium, indium, iron ($Fe^{2+}$ or $Fe^{3+}$), molybdenum, nickel, niobium, silver, strontium, tantalum, tin, titanium, tungsten, vanadium, zinc, zirconium, perovskites, and un-doped or doped combinations thereof.

28. A nanoporous-nanocrystalline film, comprising: a nanoporous-nanocrystalline, semi-conducting metal oxide having a redox chromophore attached thereto, wherein the redox chromophore comprises a compound represented by the following formula:

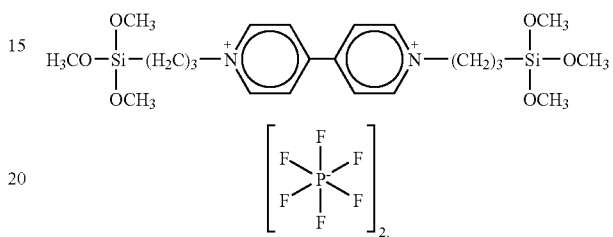

29. The nanoporous-nanocrystalline film according to claim 28, wherein the metal oxide comprises an oxide of a metal selected from at least one of chromium, hafnium, indium, iron ($Fe^{2+}$ or $Fe^{3+}$), molybdenum, nickel, niobium, silver, strontium, tantalum, tin, titanium, tungsten, vanadium, zinc, zirconium, perovskites, and un-doped or doped combinations thereof.

* * * * *